United States Patent
Borrel et al.

(10) Patent No.: US 12,044,402 B2
(45) Date of Patent: Jul. 23, 2024

(54) METHOD FOR REDUCING NITROGEN OXIDES IN STRIP HEAT TREATMENT FURNACES

(71) Applicant: ANDRITZ Technology and Asset Management GmbH, Graz (AT)

(72) Inventors: Pierre-Jerome Borrel, Montreuil (FR); Eric Blake, Sewickley, PA (US); Martin Hamman, Palaiseau (FR)

(73) Assignee: Andritz Technology and Asset Management GmbH, Graz (AT)

( * ) Notice: Subject to any disclaimer, the term of this patent is extended or adjusted under 35 U.S.C. 154(b) by 1193 days.

(21) Appl. No.: 16/630,538

(22) PCT Filed: May 29, 2018

(86) PCT No.: PCT/EP2018/064082
§ 371 (c)(1),
(2) Date: Jan. 13, 2020

(87) PCT Pub. No.: WO2019/011519
PCT Pub. Date: Jan. 17, 2019

(65) Prior Publication Data
US 2021/0080102 A1  Mar. 18, 2021

(30) Foreign Application Priority Data
Jul. 13, 2017  (AT) .............. A 50584/2017

(51) Int. Cl.
*F23C 9/08* (2006.01)
*C21D 9/56* (2006.01)
(Continued)

(52) U.S. Cl.
CPC ............. *F23C 9/08* (2013.01); *C21D 9/562* (2013.01); *F23C 6/04* (2013.01); *F23L 9/04* (2013.01); *F27B 9/28* (2013.01); *F23J 15/06* (2013.01); *F23J 2215/10* (2013.01); *F23J 2219/20* (2013.01); *F27B 2009/122* (2013.01); *F27B 9/3005* (2013.01); *F27D 17/004* (2013.01)

(58) Field of Classification Search
None
See application file for complete search history.

(56) References Cited

U.S. PATENT DOCUMENTS 4,760,995 A  *  8/1988  Fukuda ............... C21D 9/56
266/107
2013/0277896 A1  10/2013  Buchet et al.

FOREIGN PATENT DOCUMENTS

CA  1286575 C  7/1991
CA  2829991 A1 *  4/2014  ........... F23J 11/00
(Continued)

OTHER PUBLICATIONS

WO-2017159079-A1 English translation (Year: 2017).*
(Continued)

*Primary Examiner* — Steven S Anderson, II
*Assistant Examiner* — Kurt J Wolford
(74) *Attorney, Agent, or Firm* — Alix, Yale & Ristas, LLP

(57) ABSTRACT

A method for treating a metal strip, where the metal strip undergoes heat treatment in a directly fired furnace and is subsequently heat-treated further in a radiant tube furnace. At least part of the exhaust gases from the radiant tubes is fed to the directly fired furnace.

19 Claims, 3 Drawing Sheets

(51) Int. Cl.
*F23C 6/04* (2006.01)
*F23J 15/06* (2006.01)
*F23L 9/04* (2006.01)
*F27B 9/12* (2006.01)
*F27B 9/28* (2006.01)
*F27B 9/30* (2006.01)
*F27D 17/00* (2006.01)

(56) References Cited

FOREIGN PATENT DOCUMENTS

| | | | |
|---|---|---|---|
| EP | 2458022 B1 | 7/2013 | |
| EP | 3004404 B1 | 2/2017 | |
| FR | 2678047 A1 * | 12/1992 | ............... F23J 15/04 |
| JP | 57104632 A | 6/1982 | |
| WO | WO-2017159079 A1 * | 9/2017 | ............. B01D 53/86 |

OTHER PUBLICATIONS

FR-2678047-A1 English translation (Year: 1992).*
International Preliminary Report on Patentability dated Jun. 27, 2019 for International Patent Application No. PCT/EP2018/064082.
International Search Report mailed Jul. 6, 2018 (PCT/EP2018/064082).
International Preliminary Report on Patentability mailed Jun. 27, 2019 (PCT/EP2018/064082).

* cited by examiner

METHOD FOR REDUCING NITROGEN OXIDES IN STRIP HEAT TREATMENT FURNACES

BACKGROUND

Disclosed herein is a method for heat-treating a metal strip in a directly fired furnace and subsequently in a radiant tube furnace.

DE 10 2013 105 543 A1 discloses a furnace with a pre-heating zone for treating metal strip. This pre-heating zone is fired by the burner exhaust gases from combustion in the furnace. The metal strip is heated here in an atmosphere containing protective furnace gas and reaction gas, where the exhaust gases from combustion must not be fed freely to the furnace body.

U.S. Pat. No. 4,760,995 discloses a furnace with a directly fired zone followed by an indirectly fired zone, where the exhaust gases from the directly fired zone are fed to an afterburner in a way that is known.

A metal strip is often heat-treated in this way before galvanizing or also in annealing furnaces after a pickling line.

In a directly fired furnace (DFF), the burners are located directly inside the furnace.

This furnace can bring about targeted oxidation of the steel strip surface. By adjusting the lambda value of the burner gas, the atmospheric conditions can be altered from being oxidative to being reductive. In this way, oxidation of the steel strip surface can be controlled in a targeted manner.

Subsequently, heat treatment is often performed in an indirectly fired radiant tube furnace (RTF) in which the metal strip is heated by means of heat radiation with the aid of heated radiant tubes. The individual radiant tubes are heated from the inside by means of burners in a way that is known. Some (<30%) of the exhaust gases from the radiant tube burners are returned (recirculated) to the respective burner in order to optimize combustion. This recirculation of exhaust gas is a very effective method of lowering the peak temperatures in the flame and thus leads to less formation of nitrogen oxide. However, the greater part of the exhaust gases is fed to a heat exchanger and finally discharged through a stack into the atmosphere.

The burners of the directly fired furnaces are usually operated with gas (natural gas or coke oven gas). The exhaust gases from the burners are fed to an afterburner chamber fitted with a burner and undergo post-combustion there.

Nitrogen oxides ($NO_x$) contained in the exhaust gas are formed during combustion in the burners in the directly fired zone as well as during post-combustion. The term nitrogen oxide ($NO_x$) refers to the total nitrogen oxides forming during the combustion process. The most important of these compounds are usually NO and $NO_2$. $NO_x$ can form directly from the combustion air either during conversion of the fuel or due to the high process temperatures. Formation of $NO_x$ thus benefits greatly from high combustion temperatures. Thanks to newly developed gas burners, nitrogen oxide emissions have already been substantially reduced.

In order to reduce formation of nitrogen oxide during post-combustion, various different measures are currently being applied. One measure reduces the combustion temperature in the afterburner chamber by extending the non-fired zone of the furnace. The hot exhaust gases pass through this zone before entering the afterburner chamber. Due to the extended length of the zone, the exhaust gases cool down more before post-combustion and the temperature in the afterburner chamber drops. Another means of keeping the temperature of post-combustion down is to provide a supply of combustion air that has not been pre-heated. In spite of these measures, nitrogen oxides form during post-combustion.

The directives relating to nitrogen oxide emissions are becoming more and more stringent, so a further reduction would be more than welcome.

SUMMARY

The disclosed embodiments are thus based on the task of providing a low-cost method with which to further reduce the nitrogen oxide emissions in strip treatment plants.

According to the disclosed embodiments, at least part of the exhaust gases is fed from the radiant tubes to a burner in the directly fired furnace.

The exhaust gases from the radiant tubes contain carbon dioxide ($CO_2$) and steam ($H_2O$). These heavy molecules have a large heat absorption capacity. As a result, these molecules can absorb part of the combustion heat, which has the effect of reducing the peak temperatures during combustion and thus reducing the formation of $NO_x$.

The exhaust gases from the radiant tubes are preferably cooled before being fed to the directly fired furnace. These gases can be cooled by means of heat exchangers or by mixing with air.

It is favourable if part of the exhaust gases coming from the radiant tubes is fed to the afterburner chamber, preferably to the combustion air for the afterburner(s).

The combustion process is slowed down as a result, and the combustion temperature is lowered.

However, the exhaust gases can also be mixed into the flame of the afterburner or into the gaseous afterburner fuel.

It is also feasible to mix part of the exhaust gases coming from the radiant tubes with the combustion air for the burners in the directly fired zone because this too evens out the combustion temperature.

For example, part of the exhaust gases coming from the radiant tubes can be fed to at least one "nozzle mix"-type burner. With this burner type, the combustion air and the burner gas are mixed directly in the burner nozzle.

The directly fired furnace often has a non-fired zone ahead of the directly fired zone, when viewed in strip running direction. The exhaust gases from the fired zone flow through this zone and pre-heat the metal strip in this way. Only then do the exhaust gases undergo post-combustion in the afterburner chamber. Here, it is an advantage to inject or blow methane ($CH_4$) into the exhaust gas in the non-fired zone. This results in at least some of the $NO_x$ in the exhaust gas being converted (reburning) into hydrogen cyanide (HCN).

In order to degrade the hydrogen cyanide forming, air or oxygen can then be injected into the afterburner chamber, which again degrades the hydrogen cyanide that has formed.

Nitrogen is added to the methane preferably before it is injected into the non-fired zone. The methane can be blended into the exhaust gases more effectively by adding nitrogen. Methane and nitrogen can be blended and injected with the aid of Venturi nozzles.

The ratio of methane to nitrogen can be in a range of 1:10.

The methane can be injected into the non-fired zone at several points at different distances from the nearest burner.

It is favourable if 5-20% of the exhaust gases from the radiant tubes are fed to the directly fired furnace.

BRIEF DESCRIPTION OF THE DRAWINGS

In the following, three embodiments of the invention are described on the basis of drawings. In these drawings.

DETAILED DESCRIPTION

Identical reference symbols in the individual figures refer to the same plant components in each case.

Figure 1:
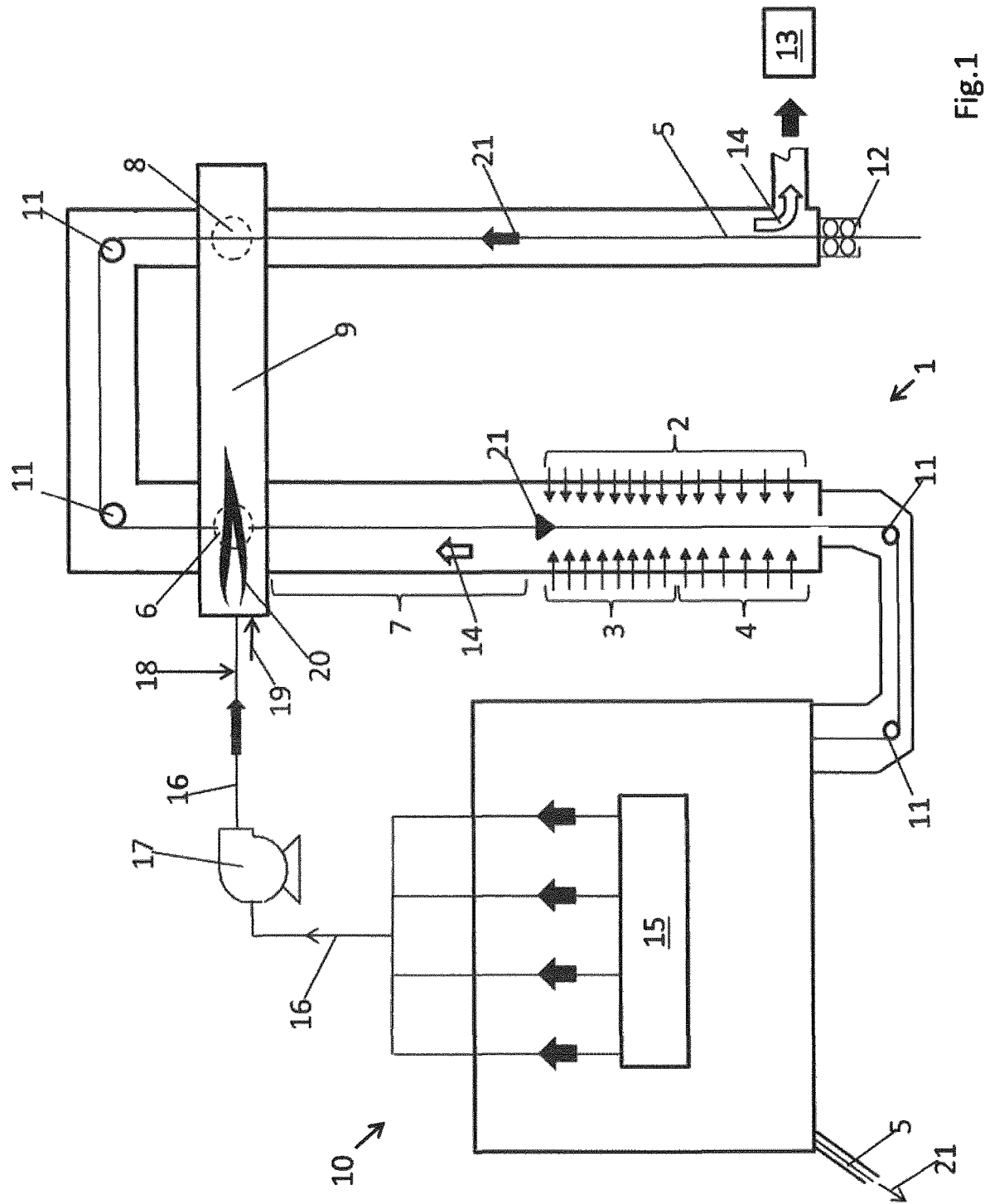
FIG. 1 shows a schematic view of a directly fired furnace (DFF) in which the exhaust gases from the radiant tube furnace (RTF) are fed to the afterburner chamber.

FIG. 1 contains a schematic diagram of a plant for heat-treating a metal strip 5. The metal strip 5 passes through a directly fired furnace (DFF) 1 first of all and then through a radiant tube furnace 10 (RTF). In the directly fired furnace 1, the metal strip 5 enters at the bottom through a gas lock 12 and runs upwards in direction 21.

In this zone, the metal strip 5 is pre-heated by the hot exhaust gases from the afterburner chamber 9. In the top furnace section, the metal strip 5 is deflected by deflection rolls 11 and passes through the non-fired zone 7, which is located directly ahead of the fired zone 2.

The non-fired zone 7 is several meters long and serves to pre-heat the metal strip 5, which also causes the hot burner exhaust gases 14 to cool down. The non-fired zone 7 here is the area before the fired zone 2, viewed in strip running direction 21, and in which there are no burners.

The metal strip 5 is heated up in the fired zone 2 of the furnace 1 with the aid of gas burners. Here, the metal strip 5 passes first of all through a zone 3 in which "nozzle mix" type burners are mounted in the furnace wall and then through a zone 4 with "premix" type burners.

The exhaust gas 14 forming due to the gas burners in the directly fired zone 2 flows upwards in the furnace 1 and is fed there through an opening 6, in a way that is known, to the afterburner chamber 9 containing an afterburner 20 for post-combustion of the exhaust gases 14. In this process, the carbon monoxide (CO) contained in the exhaust gases 14 and the hydrogen ($H_2$) is essentially burned off (or oxidizes completely). The metal strip 5 does not pass through the afterburner chamber 9. The exhaust gases from the afterburner chamber 9 are then guided through the opening 8 again into the furnace area that the metal strip 5 passes through. In the bottom section of the furnace 1, the exhaust gases 14 are fed to a heat recovery system 13.

At the lower end of the furnace 1, the metal strip 5 is deflected with the aid of the deflection roll 11 and then fed to the radiant tube furnace 10. The strip path through the furnace 10 is not shown here.

In all disclosed embodiments, at least some of the exhaust gases 16 from the radiant tubes are fed to a portion of the directly fired furnace 1.

In the present example of FIG. 1, these exhaust gases 16 are collected in a collector 15 and fed to the afterburner chamber 20 via a fan 17. The exhaust gases 16 are mixed with combustion air 18 before reaching the afterburner 20. The combustion gas is supplied through the pipe 19. The exhaust gases 16 absorb part of the combustion heat, which lowers the peak temperatures during post-combustion, thus reducing the formation of $NO_x$.

Figure 2:
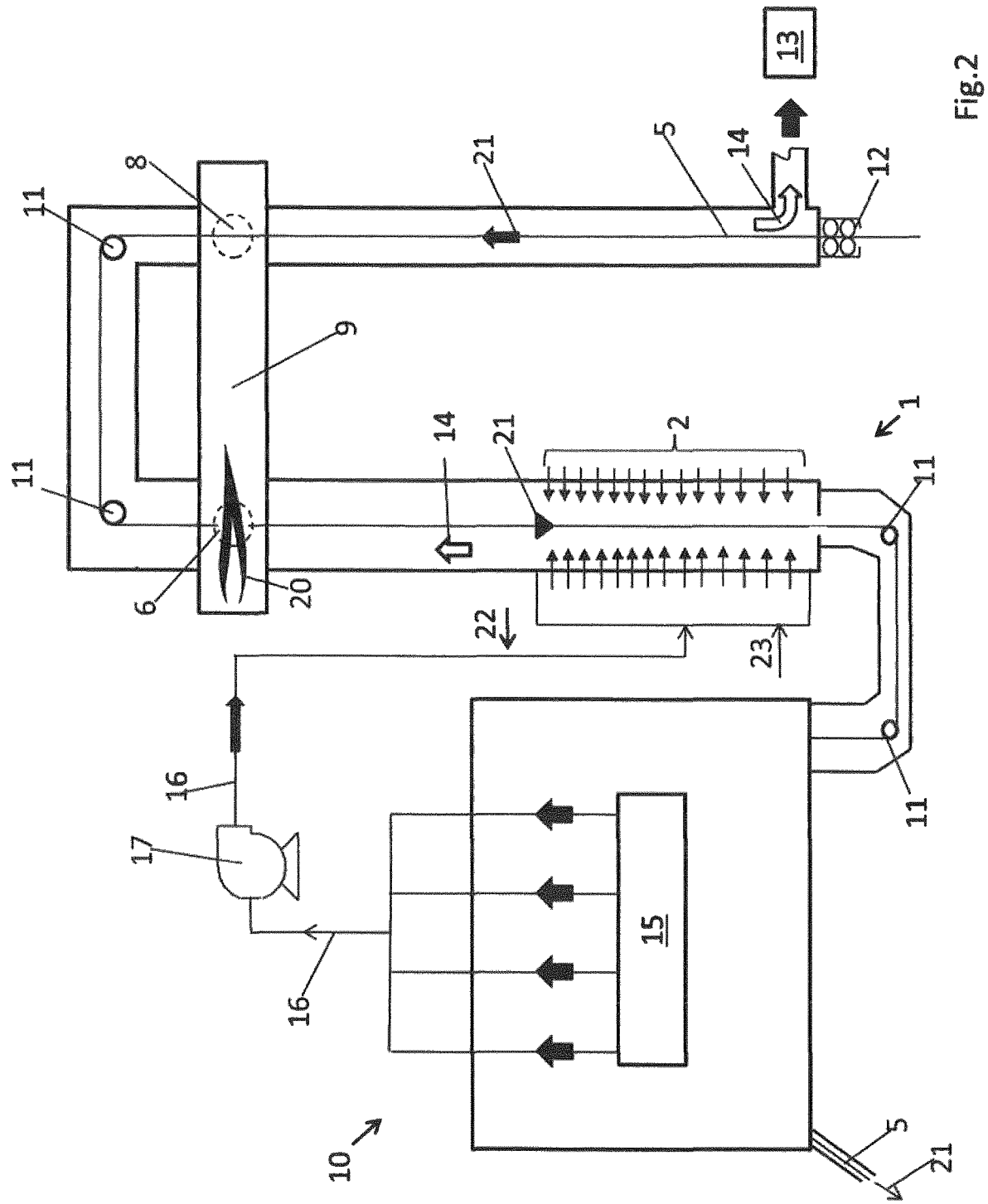
FIG. 2 shows a schematic view in which the exhaust gases are fed to the burners of the directly fired furnace.

In FIG. 2, at least part of the exhaust gases 16 from the furnace 10 heated by radiant tubes is fed to the burners of the directly fired furnace 1. In the present example, they are mixed beforehand with combustion air 22. In addition, gaseous fuel 23 is fed to the burners. This also leads to a reduction in nitrogen oxide because the temperature peaks in the burners are reduced as a result of the supply of exhaust gas 16.

Figure 3:
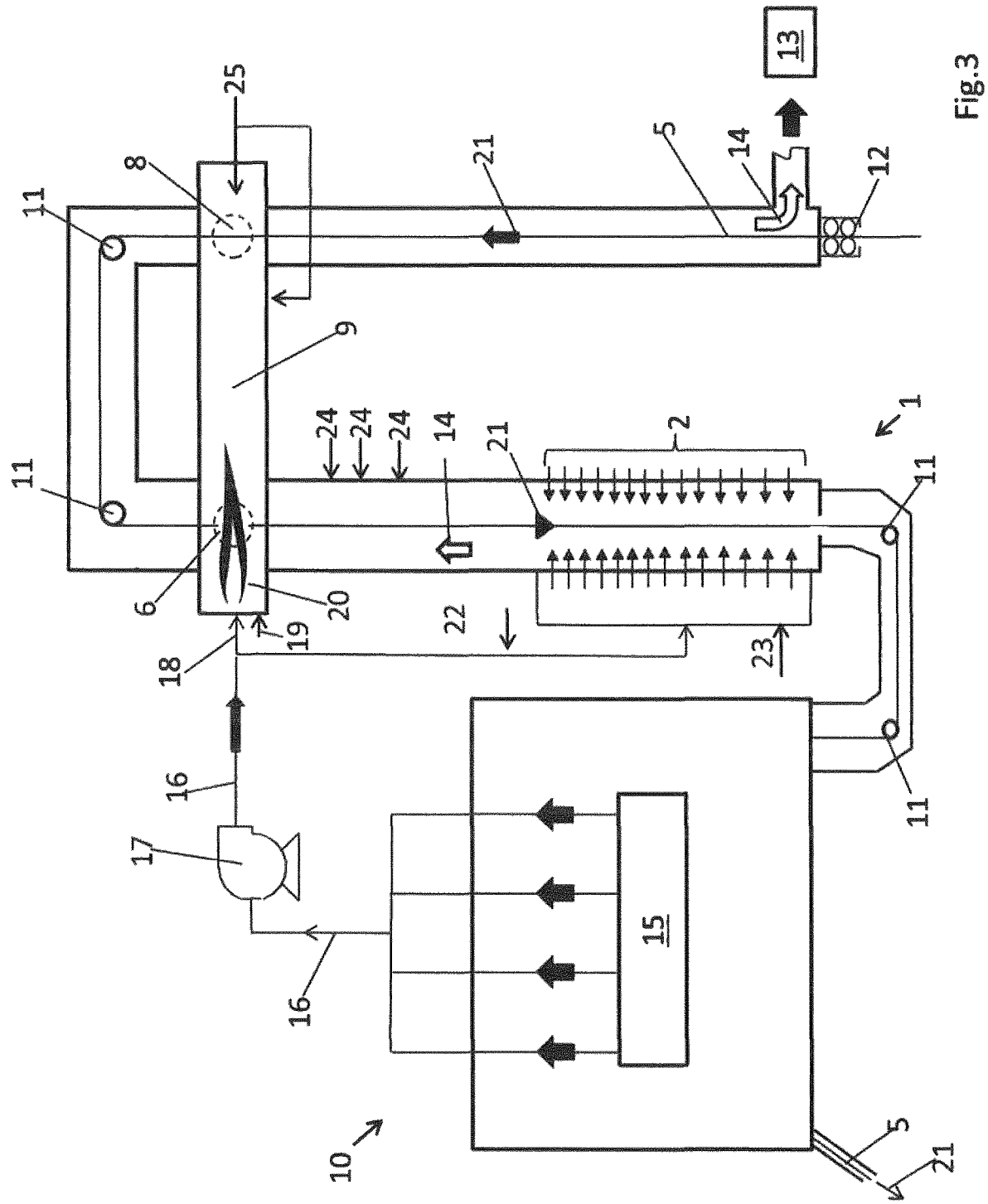
FIG. 3 shows a combination of FIGS. 1 and 2, where methane is also injected or blown into the non-fired zone of the DFF.

FIG. 3 shows an example of an embodiment in which the exhaust gases from the RTF 10 are fed to the afterburner chamber 9 and the burners of the directly heated furnace 1. In order to further reduce this nitrogen oxide content, methane (CH4) is injected in addition through the feed pipes 24 or blown with the aid of nitrogen into the non-fired zone 7 of the furnace 1. The methane blends with the hot exhaust gases, and the nitrogen oxides react with the methane to form hydrogen cyanide. It is also possible to use a conventional burner for this task, replacing the combustion air with nitrogen oxide.

The methane can be injected at several points at different distances from the directly fired zone 2, for example at a distance of 1 m, 2 m, and 3 m from the nearest burner.

Methane gas injection can be retrofitted easily to existing plants to thus reduce nitrogen oxide emissions. With the present method, $NO_x$ values can be achieved in the region of 100 mg/$Nm^3$ or less.

The amounts of methane gas required can be relatively small here. A quantity of 5 $m^3$/h may be sufficient for a standard furnace 1. It is useful if this non-fired zone 7 is largely free of oxygen ($O_2$ content <0.05%) so that oxygen cannot react with the methane blown in. In order to guarantee that it remains oxygen-free, at least the burners nearest to it can be operated with excess fuel so that any oxygen present is burnt off beforehand.

In order to degrade the toxic hydrogen cyanide, oxygen ($O_2$) or air is blown into the afterburner chamber 9 through pipes 25, causing a reaction in the hydrogen cyanide to form nitrogen (N2), carbon dioxide and hydrogen and/or steam.

Of course, the method according to the invention can also be used in a horizontal furnace configuration.

REFERENCE NUMERALS

1 Directly fired furnace
2 Fired zone
3 "Nozzle Mix" type burner
4 "Premix" type burner
5 Metal strip
6 Opening to afterburner chamber
7 Non-fired zone
8 Opening from the afterburner chamber into the furnace
9 Afterburner chamber
10 RTF
11 Deflection roll
12 Gas lock
13 Heat recovery plant
14 Exhaust gases from the burners
15 Collector for the RTF exhaust gases
16 RTF exhaust gases
17 Fan
18 Combustion air
19 Gas supply
20 Afterburner
21 Strip running direction
22 Air supply
23 Combustion gas supply
24 Methane supply
25 Air supply

The invention claimed is:
1. A method for treating a metal strip (5), comprising:
providing a metal strip (5);

heat treating the metal strip (5) in a directly fired furnace (1) to yield a directly heated metal strip;

heat treating the directly heated metal strip in a radiant tube furnace (10), thereby forming exhaust gases (16); and feeding at least a portion of the exhaust gases (16) from the radiant tubes to at least one burner in the directly fired furnace (1) with the exhaust gases of the radiant tube furnace being mixed with combustion air fed to the at least one burner.

2. The method according to claim 1, comprising the step of cooling exhaust gases (16) prior to the step of feeding at least a portion of the exhaust gases to at least one burner in the directly fired furnace (1).

3. The method of claim 2, wherein the exhaust gases (16) are cooled with the aid of a heat exchanger.

4. The method according to claim 2, wherein the directly fired furnace (1) has an afterburner chamber (9) in which exhaust gases (14) formed in the directly fired furnace (1) undergo post-combustion, wherein the step of feeding at least a portion of the exhaust gases (16) from the radiant tubes to at least one burner in the directly fired furnace (1) includes feeding at least a sub-portion of the exhaust gases (16) to the afterburner chamber (9).

5. The method according to claim 2, wherein a sub-portion of the exhaust gases (16) fed from the radiant tubes is mixed with combustion air (22) for the burners in the directly fired zone (2).

6. The method according to claim 1, wherein the directly fired furnace (1) has an afterburner chamber (9) in which exhaust gases (14) formed in the directly fired furnace (1) undergo post-combustion, wherein the step of feeding at least a portion of the exhaust gases (16) from the radiant tubes to at least one burner in the directly fired furnace (1) includes feeding at least a sub-portion of the exhaust gases (16) to the afterburner chamber (9).

7. The method according to claim 6, wherein a sub-portion of the exhaust gases (16) fed from the radiant tubes is fed directly to the afterburner chamber (9).

8. The method according to claim 6, wherein a sub-portion of the exhaust gases (16) fed from the radiant tubes is mixed with combustion air (18) for the afterburner (20) in the afterburner chamber (9).

9. The method according to claim 6, wherein a sub-portion of the exhaust gases (16) fed from the radiant tubes is mixed with combustion air (22) for the burners in the directly fired zone (2).

10. The method according to claim 6, wherein
the directly fired furnace (1) has a non-fired zone (7) rear of the directly fired zone (2) and an afterburner chamber (9) rear of the non-fired zone (7) relative to a direction (21) in which the metal strip (5) runs,
exhaust gases (14) from the directly fired zone (2) flow through the non-fired zone (7) and pre-heat the metal strip (5), and
the exhaust gases (14) undergo post-combustion in the afterburner chamber (9) after passing through the non-fired zone (7), comprising the step of
blowing methane into the exhaust gases (14) in the non-fired zone (7), thereby causing at least a portion of any nitrogen oxides present in the exhaust gas (14) to be converted into hydrogen cyanide.

11. The method according to claim 1, wherein a sub-portion of the exhaust gases (16) fed from the radiant tubes is mixed with combustion air (22) for the burners in the directly fired zone (2).

12. The method according to claim 11, wherein a sub-portion of the exhaust gases (16) coming from the radiant tubes is fed to a least one nozzle mix type burner.

13. The method according to claim 1, wherein between 5% and 20% of the exhaust gases (16) present in the radiant tubes is fed to the directly fired furnace (1).

14. The method according to claim 1, wherein;
the burner in the directly fired furnace is located upstream of the radiant tube furnace relative to a running direction of the metal strip,
the radiant tube furnace is located downstream of a fired zone relative to the running direction of the metal strip,
the fired zone is located downstream of an afterburner relative to the running direction, and
at least some of the exhaust gasses pass through the afterburner before entering a section of the directly fired furnace that the metal strip passes through.

15. The method according to claim 1, wherein;
the burner in the directly fired furnace is located upstream of the radiant tube furnace relative to a running direction of the metal strip,
the radiant tube furnace is located downstream of a fired zone relative to the running direction of the metal strip, and
the fired zone is located downstream of an afterburner relative to the running direction.

16. The method according to claim 1, wherein;
the burner in the directly fired furnace is located upstream of the radiant tube furnace relative to a running direction of the metal strip,
the radiant tube furnace is located downstream of a fired zone relative to the running direction of the metal strip,
the fired zone is located downstream of an afterburner relative to the running direction, and
the afterburner provides post-combustion of the exhaust gasses in order to burn off carbon monoxide and hydrogen.

17. A method for treating a metal strip (5), comprising:
providing a metal strip (5);
heat treating the metal strip (5) in a directly fired furnace (1) to yield a directly heated metal strip;
heat treating the directly heated metal strip in a radiant tube furnace (10), thereby forming exhaust gases (16); and
feeding at least a portion of the exhaust gases (16) from the radiant tubes to at least one burner in the directly fired furnace (1), wherein;
the directly fired furnace (1) has a non-fired zone (7) arranged before the directly fired zone (2) and an afterburner chamber (9) arranged before the non-fired zone (7) relative to a direction (21) in which the metal strip (5) runs,
exhaust gases (14) from the directly fired zone (2) flow through the non-fired zone (7) and pre-heat the metal strip (5), and
the exhaust gases (14) undergo post-combustion in the afterburner chamber (9) after passing through the non-fired zone (7), comprising the step of
blowing methane into the exhaust gases (14) in the non-fired zone (7), thereby causing at least a portion of any nitrogen oxides present in the exhaust gas (14) to be converted into hydrogen cyanide.

18. The method according to claim 17, comprising the step of providing a source of oxygen (25) to the post-combustion chamber (9), which degrades at least a portion of the hydrogen cyanide formed therein.

19. The method according to claim 17, comprising the step of adding nitrogen to the methane to form a nitrogen-methane mixture that is blown into the non-fired zone (7).

* * * * *